United States Patent
Pedenaud et al.

(10) Patent No.: US 10,414,673 B2
(45) Date of Patent: Sep. 17, 2019

(54) METHOD AND DEVICE FOR THE UNDERWATER TESTING OF A FILTRATION SYSTEM

(71) Applicants: TOTAL SA, Courbevoie (FR); SAIPEM S.A, Montigny le Bretonneux (FR); VEOLIA EAU—COMPAGNIE GENERALE DES EAUX, Paris (FR); VWS WESTGARTH LTD, East Kilbride (GB)

(72) Inventors: Pierre Pedenaud, Lescar (FR); Samuel Heng, Sedze-maubecq (FR); Didier Bigeonneau, Montbrun-lauragais (FR); Stéphane Anres, Saint Cyr l'ecole (FR); Raymond Hallot, Voisins le Bretonneux (FR); Michel Baylot, Saint le Jeune (FR); Mourad Ben Boudinar, Glasgow (GB); Graeme Skivington, Glasgow (GB)

(73) Assignees: TOTAL SA, Courbevoie (FR); SAIPEM S.A., Montigny le Bretonneux (FR); VEOLIA EAU—COMPAGNIE GENERALE DES EAUX, Paris (FR); VWS WESTGARTH LTD., East Kilbride (GB)

( * ) Notice: Subject to any disclaimer, the term of this patent is extended or adjusted under 35 U.S.C. 154(b) by 386 days.

(21) Appl. No.: 14/429,974

(22) PCT Filed: Sep. 19, 2013

(86) PCT No.: PCT/FR2013/052165
§ 371 (c)(1),
(2) Date: Mar. 20, 2015

(87) PCT Pub. No.: WO2014/044976
PCT Pub. Date: Mar. 27, 2014

(65) Prior Publication Data
US 2015/0274553 A1 Oct. 1, 2015

(30) Foreign Application Priority Data
Sep. 20, 2012 (FR) .................................. 12 58852

(51) Int. Cl.
*C02F 1/44* (2006.01)
*B01D 61/12* (2006.01)
(Continued)

(52) U.S. Cl.
CPC .............. *C02F 1/442* (2013.01); *B01D 29/68* (2013.01); *B01D 61/027* (2013.01); *B01D 61/12* (2013.01);
(Continued)

(58) Field of Classification Search
CPC ...................................................... B01D 29/68
See application file for complete search history.

(56) References Cited

U.S. PATENT DOCUMENTS 4,332,679 A * 6/1982 Hengst ................. B01D 35/143
210/266
4,469,595 A * 9/1984 Napadow ............... B01D 29/01
118/326
(Continued)

FOREIGN PATENT DOCUMENTS

CN 101 844 002 A 9/2010
GB 2 451 008 A 1/2009
(Continued)

OTHER PUBLICATIONS

International Search Report, Application No. PCT/FR2013/052165, filed Sep. 19, 2013, dated Feb. 5, 2014, 6 pages.

*Primary Examiner* — Peter Keyworth
(74) *Attorney, Agent, or Firm* — Patterson Thuente Pedersen, P.A.

(57) ABSTRACT

A method for testing an underwater filtration system as well as the underwater testing device which enables the operation
(Continued)

of filtration systems in aquatic conditions. The testing method includes introducing a flow of water into the underwater testing device via a water inlet, said underwater testing device including at least one filter, bringing said flow in the underwater testing device up to said filter, obtaining a filtrate downstream of said filter and discharging said filtrate into the environment via a discharge pipe. The underwater testing device is placed underwater at a depth of at least 500 meters.

12 Claims, 2 Drawing Sheets

(51) Int. Cl.
| | |
|---|---|
| *E21B 43/36* | (2006.01) |
| *B01D 29/68* | (2006.01) |
| *B01D 61/02* | (2006.01) |
| *B01D 65/02* | (2006.01) |
| *B01D 65/10* | (2006.01) |
| *B01D 61/22* | (2006.01) |
| *C02F 101/10* | (2006.01) |

(52) U.S. Cl.
CPC .............. *B01D 65/02* (2013.01); *B01D 65/10* (2013.01); *E21B 43/36* (2013.01); *B01D 61/22* (2013.01); *C02F 2101/101* (2013.01)

(56) References Cited

U.S. PATENT DOCUMENTS

| | | | |
|---|---|---|---|
| 7,600,567 | B2 | 10/2009 | Christopher |
| 2003/0205526 | A1* | 11/2003 | Vuong ................. B01D 61/022 |
| | | | 210/652 |
| 2009/0020289 | A1 | 1/2009 | Sharif |
| 2010/0140170 | A1* | 6/2010 | Haun, Jr. ............. B01D 61/147 |
| | | | 210/636 |
| 2011/0132842 | A1 | 6/2011 | Salyer |
| 2012/0067820 | A1 | 3/2012 | Henthorne et al. |
| 2012/0073822 | A1 | 3/2012 | Evans et al. |

FOREIGN PATENT DOCUMENTS

| | | |
|---|---|---|
| WO | WO 2006/134367 | 12/2006 |
| WO | WO 2007/138327 A1 | 12/2007 |
| WO | WO 2009/122134 | 10/2009 |

* cited by examiner

METHOD AND DEVICE FOR THE UNDERWATER TESTING OF A FILTRATION SYSTEM

RELATED APPLICATIONS

The present application is a National Phase entry of PCT Application No. PCT/FR2013/052165, filed Sep. 19, 2013, which claims priority from FR Patent Application No. 12 58852, filed Sep. 20, 2012, said applications being hereby incorporated by reference herein in their entirety.

TECHNICAL SCOPE OF THE INVENTION

The present invention is to be found in the field of underwater applications, in particular within the oil and gas sector. More specifically, the invention concerns a method for testing an underwater filtration system as well as the underwater testing device which enables the operation of filtration systems in aquatic conditions to be studied.

BACKGROUND OF THE INVENTION

The injection of water into hydrocarbon fields is a well-known technique in the oil and gas sector. It is an operation which consists in injecting water, commonly known as injection water, into an oil and gas well, on the one hand to recover the hydrocarbons and on the other hand to avoid the wells collapsing, which can come about due to the drop in pressure as a result of the hydrocarbons being extracted.

The origin of the injection water generally depends on its availability and on the constraints around the site of the hydrocarbon extraction. For example, in the case of offshore extraction, using water drawn from the sea is known. Treatment steps, however, are generally essential in order to obtain from the seawater water which has the quality sufficient to enable it to be reintroduced into the underground formation. The injection water is always obtained by means of a filtration step, aiming to reduce or even eliminate suspended matter, and by means of a deoxygenation step. Often a supplementary treatment in the form of desulphurization is used if the contents of the underground formation are such that reduction in the sulfate ions is necessary.

The injection water can also be aquifer water, river or lake water, and possibly domestic or industrial wastewater. Here too, treatment steps can be necessary to obtain water which has a quality which is compatible with injection into the underground formation.

When the injection water is seawater, the presence of sulfates in the water is typically a problem if the underground formation contains barium, calcium or strontium ions. Indeed, the sulfate ions form with the barium, calcium or strontium ions precipitates which create mineral deposits (scaling) and these are disadvantageous to good hydrocarbon extraction. Furthermore, the presence of sulphates can be the cause of the generation by bacteria of hydrogen sulfide ($H_2S$), a toxic and corrosive gas, which can cause piping that is used for recovering hydrocarbons to corrode. The elimination of the sulfates from the water before it is injected into the underground formation is therefore often necessary.

A conventional method enabling the elimination of sulphates from the water consists in a nanofiltration membrane method which retains the multivalent ions and allows the monovalent ions to pass. Another conventional method enabling water desalination consists in a reverse osmosis method. Such methods are described, for example, in patent applications WO 2006/134367 and WO 2007/138327.

Generally, the water treatment units are placed close to the hydrocarbon field. In the case of underwater fields, said units are conventionally installed on the surface, on the offshore platform for extracting hydrocarbons or on attached floating platforms, currently called FPSO units (acronym of "Floating Production, Storage and Offloading" according to Anglo-Saxon terminology, signifying a floating unit for production, storage and offloading).

One of the major problems associated with installing water treatment units on the surface is the space required. Said units take up space. Yet the management of space on the offshore platforms is tricky as space is limited and many of the installations are essential. There is therefore a need for water treatment units which require minimum space on offshore platforms.

One solution to this problem has already been proposed in the prior art. It consists in replacing the existing treatment units by underwater units which are capable of operating underwater. In particular, international patent application WO 2009/122134 describes an underwater seawater treatment unit. The fact of putting the unit underwater also has an advantage in terms of power: the system placed in an underwater environment profits from hydrostatic pressure which is approximately proportional to the depth at which it is situated. U.S. Pat. No. 7,600,567 and patent application GB 2 451 008 also describe an underwater water treatment unit which is able to be placed underwater at a depth of between 250 and 700 meters inclusive.

Now currently, discoveries of large size hydrocarbon fields are made increasingly rarely in shallow and moderately deep waters, that is to say at depths of up to 500 meters. With the aim of ensuring renewal of reserves, it is necessary to develop new fields which are located at great depths (that is to say at a depth of between 500 and 1,500 meters inclusive) and at ultra-great depths (that is to say deeper than 1,500 meters).

In shallow and moderately deep waters, temperature and salinity conditions as well as aquatic fauna are not radically different to conditions on the surface. By contrast, at great depths and ultra-great depths, the water temperature is approximately between 3° C. and 5° C. and the water viscosity increases with the depth. Thus, the environmental conditions to which the underwater water treatment units are subjected are quite specific.

In addition, the true underwater environment cannot be defined solely by conditions of pressure and temperature. It is a complex environment, with variable chemical compositions, above all including micro-organisms that are specific to great depths and to the ultra-great depths.

Said micro-organisms tend to hang onto and build up on certain surfaces, and more particularly to clog up all underwater devices rapidly. Said phenomenon of clogging up which is biological in origin is currently designated by the Anglo-Saxon term of biofouling. It is a question of the degradation or deterioration of a surface or of an object left in an aquatic environment, as typically in the sea, by the growth of living organisms such as bacteria, protozoa, algae and crustaceans.

When they are placed at great depths or at ultra-great depths, the underwater water treatment units, and in particular the filtration membranes that they contain, are therefore subject to very specific environmental conditions. Traditionally, the operation of filtration membranes under said conditions of pressure, temperature and salinity has been reproduced in a laboratory.

However, said solution is not totally satisfactory. Indeed, at the present time, researchers do not have the knowledge to simulate in a reliable manner the phenomenon of biofouling in a laboratory as too many parameters, such as the nature of the bacteria, the sea currents, the seasonal changes, etc., cannot be reproduced.

Now, in the case of seawater treatment units with a view to using the water as injection water in an oil well, said units preferably have to remain operational for several months, or even several years without any intervention whatsoever. Furthermore, it is preferable for the unit to be as sturdy as possible so as to reduce the number of essential maintenance operations.

Thus, the study of the clogging up by biofouling of filters intended for the great depths and the ultra-great depths is particularly important as it would enable the maintenance devices and procedures that are the most suitable for underwater seawater treatment units to be defined with a view to the water being used as injection water in an oil well.

The problem posed is equally true for any underwater installation which has a filtration system. There are numerous cases where the researchers and manufacturers need to operate filters underwater, for example in the seas and oceans. For example, the devices for pumping seawater for analysis purposes or for industrial purposes, or the devices for research into and study of shipwrecks at great depths can be cited.

By way of example, patent application US 2011/0132842 describes a device and a method for purifying water, notably for human consumption, using a combination of a reverse osmosis unit and a dehumidification unit. Another example is given by patent application CN 101844002 which describes a filtration method and device which enable water samples to be taken and analyzed in-situ. However, none of said documents neither discloses nor even suggests a method for evaluating the clogging up of filters in-situ.

It is in said context that the inventors have developed a method for evaluating the operation of filters, which enables, using an underwater testing device, the clogging up of filters to be studied directly in the real underwater environment.

SUMMARY OF THE INVENTION

The object of the present invention, among other things, is a method for testing an underwater filtration system including at least one filter, said method including the steps consisting in:
  introducing a flow of water into an underwater testing device via a water inlet, said underwater testing device including said filter;
  bringing said flow in the underwater testing device up to said filter;
  obtaining a filtrate downstream of said filter and discharging said filtrate into the environment via a discharge pipe;
  said underwater testing device being placed underwater at a depth of at least 500 meters.
  Furthermore, the underwater testing device including:
  at least one filter;
  a water inlet which is suitable for introducing a flow of water sampled from the environment of the device into the underwater device;
  a pipe connecting said water inlet and said filter;
  a discharge pipe downstream of said filter that is suitable for discharging the filtrate into the environment of the device;
  at least one pump which is suitable for filtering of the flow of water across said filter;
  a means for supplying the device with power,
is also an object of the present invention.

The invention further concerns the use of said underwater testing device in order to follow the evolution of the fouling of a filter placed in an aquatic environment in real conditions.

DETAILED DESCRIPTION OF THE INVENTION

In the present application, the expression "between . . . and . . . inclusive" must be understood as including the limit values.

The method for testing an underwater filtration system according to the invention first of all includes a step consisting in introducing a flow of water into an underwater testing device via a water inlet. The underwater testing device, which is also an object of the invention, is characterized among other things by the fact that said device includes at least one filter which is the filter of the underwater filtration system which is to be tested.

In the present invention, the term 'filter' must be understood in the wide sense as designating a porous device across which a liquid flow can be made to pass in order to separate certain components from it. Osmosis membranes, although not porous, will be considered below as filters.

The filter can be chosen from the group constituted by a sieve, a pre-filter and a filtration membrane. The filtration membrane can itself be chosen from the group consisting of a microfiltration membrane, an ultrafiltration membrane, a nanofiltration membrane and an osmosis membrane.

A sieve is a grid having a mesh that is more or less fine or a surface that is perforated with holes. The job of a sieve is generally to separate different sized solid particles from a liquid flow, the size of the particles separated depending on the size of the mesh or the holes in the filter.

The term "pre-filter" designates a filter that is likely to stop relatively large-sized solid particles, that is to in excess of 100 micrometers. The pre-filter enables coarse filtering.

Furthermore, the filtration membranes are devices that are well known by the expert which enable different components of a liquid flow to be separated. The nature of the separation is determined in part by the dimension of the pores in the membranes.

According to the IUPAC classification:
  a microfiltration membrane has macropores the diameter of which is in excess of 50 nm,
  an ultrafiltration membrane has mesopores the diameter of which is between 2 nm and 50 nm inclusive,
  a nanofiltration membrane has micropores the diameter of which is less than 2 nm.

On the other hand, osmosis membranes are specific membranes which are well known by the expert. An osmosis membrane is a semi-permeable membrane which only allows solvent (in general water) to pass and not other substances in solution.

In a preferred manner, the filter of the present invention can be a filtration membrane, and in an even more preferred manner a nanofiltration membrane, or even a reverse osmosis membrane. In addition, according to a more advantageous embodiment, the filter in the present invention is a membrane for desulfation. The term "membrane for desulfation" refers in the present invention to a membrane which enables sulfate ions to be separated from water. It is a particularly advantageous embodiment for the oil industry as said membranes enable the elimination of sulfates in the seawater which is intended to be re-injected into the underground formations which contain hydrocarbons.

Among the nanofiltration membranes for the desulfation of seawater, the membranes SR90 of DOW Filmtec and the NANO-SW of Hydranautics can be cited, among others. The underwater testing device according to the invention can advantageously recreate a more complex underwater filtration system. In particular, the underwater testing device can include several filters, arranged in series and/or in parallel, which are identical or different. According to one preferred embodiment, the underwater testing device includes a filter which is a nanofiltration membrane for desulfation, and a pre-filter, said pre-filter being situated upstream of said nanofiltration membrane for desulfation. The device can therefore include, in order with respect to the normal flowing of the water flow in the system:

a water inlet;
a pipe connecting said water inlet and a pre-filter;
said pre-filter;
a pipe connecting said pre-filter and desulfation membrane;
said nanofiltration membrane for desulfation; then
on the one hand, a discharge pipe downstream of said desulfation membrane; and on the other hand, a discharge pipe for the retentate of the desulfation membrane.

The flow of water enters the underwater testing device via a water inlet. A water inlet is a conventional system which includes an opening enabling a flow of water to enter the system. The water inlet can possibly be provided with a strainer screen which holds back large diameter solid elements, thus avoiding the filtration system quickly becoming blocked by large elements.

The location of the water inlet determines the quality of the water entering the underwater testing device. In an advantageous manner, the water inlet can be mobile, for example by means of a telescopic system which enables the site of the water inlet to be varied without modifying the location of the testing device itself. In particular, a telescopic system can allow the level of the water inlet to be moved, referenced with respect to the bottom of the water or to the surface. The method according to the invention can possibly include a step consisting in moving the water inlet, using for example telescopic system which is remotely controlled or is controlled by a pre-recorded program. Said step for moving the water inlet, without moving the assembly of the underwater testing device, can be particularly advantageous as it enables the biological and physico-chemical conditions of the flow of water intended to cross the filter to be varied without moving the underwater testing device.

The method for testing an underwater filtration system according to the invention then includes the steps consisting in bringing the flow water that has entered the underwater testing device up to the filter, then obtaining a filtrate downstream of said filter and discharging said filtrate into the environment via a discharge pipe.

In the underwater testing device of the present invention, the filter can be placed in a specific module which includes two chambers, a first chamber upstream of the filter and a second chamber downstream of the filter, the filter forming a partition between the two chambers. The first chamber upstream is provided with at least one pipe which enables the inlet of the water flow. The second chamber downstream is provided with at least one discharge pipe. The first chamber upstream is possibly also equally provided with a second discharge pipe. The dimensioning of the chambers upstream and downstream can be made by the expert, in particular in terms of the type of filter and the nature of the speed of the flow to be filtered.

Conventionally, the flow of water can be brought into the first chamber of the filter by a supply pipe. The portion of the flow which crosses the filter and reaches the second chamber, downstream of the filter, is commonly called the filtrate. The portion of the flow which is retained by the filter is commonly called the retentate. According to the type of filter, the retentate can be solid, liquid or a mixture of the two.

In order to make the water circulate across the filter, the underwater testing device according to the invention includes at least one pump which is suitable for filtering the flow of water. Said pump can be situated on the pipe which connects the water inlet and the filter. The pump can be controlled by an electronic system. Said electronic system can be controlled by a pre-recorded program which does not require the intervention of an operator. As an alternative to this, it can be controlled by an operator, preferably located on the surface, and the information exchanged between the operator and the electronic system can be transmitted via cable or online (for example, wirelessly).

The job of the discharge pipe downstream of the filter is to discharge the filtrate from the device. As the device according to the invention is an underwater testing device, not recovering the filtrate is preferred. It is, therefore, preferably ejected directly into the environment, close to the underwater testing device. In this way, the filtrate is preferably not stored, even temporarily, between when it is obtained downstream of the filter and its discharge into the environment. In a preferred manner, the device does not include a storage container for the filtrate.

The underwater testing device according to the invention can possibly include a discharge pipe for the retentate of the filter. As the device according to the invention is an underwater testing device, not recovering the retentate is also preferred. It is, therefore, preferably ejected directly into the environment, close to the underwater testing device. When the device does not include a discharge pipe for the retentate, the retentate can be accumulated upstream of the filter. The present underwater testing device can enable the speed of accumulation of the retentate at the filter to be evaluated, and thus to predict, in real conditions, the service life of the filter, the necessary cleaning frequency or even appropriate dimensioning.

The flow rate of the water filtered according to the invention is advantageously between 0.02 and 5.00 $m^3/h$ inclusive. By way of comparison, the flow rate of water filtered in a water treatment unit intended to be injected into an oil well is in excess of 30 $m^3/h$.

A flow rate of 0.02 $m^3/h$ can be achieved using a reverse osmosis membrane with the dimensions (2.54 cm×2.54 cm)×6.35 cm.

A flow rate of 5.00 m³/h can be achieved using a nanofiltration membrane with the dimensions (10.16 cm×15.24 cm)×10.16 cm, possibly using several membranes.

In a specific embodiment, the testing device includes a nanofiltration membrane with the dimensions (2.54 cm×15.24 cm)×6.35 cm and the flow rate of water filtered across said membrane is between 0.2 and 0.4 m.³/h inclusive.

Furthermore, the method for testing according to the invention is characterized by the fact that the underwater testing device is placed underwater at a depth of at least 500 meters, notably of at least 800 meters. The depth of the device is in a preferred manner between 800 meters and 3000 meters inclusive, in a more preferred manner between 1000 meters and 3000 meters inclusive, and in an even more preferred manner between 1500 meters and 3000 meters inclusive.

In a preferred manner, the underwater testing device is placed in the sea, and the flow of water filtered is a flow of seawater.

The underwater testing device is subject to an outside pressure which, in a preferred manner, is between 80 and 300 bar inclusive, said pressure naturally being a function of the depth at which the underwater testing device is positioned, which corresponds in a preferred manner to the depth of positioning of the definitive underwater filtration system. The temperature existing at the site where the underwater testing device is positioned is also a function of the depth at which the underwater testing device is situated, but also more generally of the geographic location where the underwater testing device is placed. For example, if the underwater testing device is positioned at a depth of 3000 meters in the Gulf of Guinea, the temperature of the water will be approximately 4° C. If the underwater testing device is positioned at a depth of 500 meters in the Arctic Ocean, notably at a depth of 800 meters, the temperature of the water will be approximately −2° C. In a general manner, the underwater testing device is subject to an outside temperature of between 10° C. and −2° C. inclusive.

It is well known that underwater the service life and the filtration capacity of the filters can be greatly reduced by the phenomenon of biofouling which causes the filters to clog up. However, it is difficult to anticipate the phenomenon of biofouling in the specific conditions of the depths of the Ocean: indeed, the bacterial flora is not well known, and the possible impact the high pressures and low temperatures can have on the biofouling has not been controlled. So as to optimize the dimensioning and the operation of an underwater seawater filtration system, it is necessary to have precise knowledge of the risks of biofouling in the biological and physico-chemical conditions existing at the site where the underwater seawater filtration system will be installed.

The object of the testing method of the present invention is to operate a filter in-situ, that is to say in the biological and physico-chemical conditions existing at the installation site of the underwater testing device, said site corresponding to the projected installation site of the definitive underwater filtration system. The operation of the filter can be monitored whilst the method according to the invention is implemented. The method according to the invention, as well as the underwater testing device which is specifically designed for the implementation of the testing method, are therefore particularly advantageous for quantifying in a reliable manner the risk of clogging, notably as a result of biofouling, and for optimizing in fine the dimensioning and the operation of the definitive underwater filtration system.

The monitoring of the operation of the filter can be made at all times according to the techniques known by the expert. For example, it may be possible to bring the underwater testing device to the surface after a given amount of time and an operator can confirm the state of clogging of the filter.

In order to be able to follow the evolution of the level of clogging of the filter over time, the testing method according to the invention can advantageously further include a step consisting in:
measuring the difference in pressure between the upstream side and the downstream side of the filter; and
recording said measurement of the difference in pressure in a storage means situated in the underwater testing device or transmitting said measurement of the difference in pressure to a receiving means situated outside the underwater testing device.

In order to perform said function, the underwater testing device according to the invention can further advantageously include a means for measuring the difference in pressure between the upstream side and the downstream side of the filter.

Indeed, the efficiency of the filtration is directly connected to the pressure differential between the upstream side and the downstream side of the filter. A decrease in the efficiency of the filtration, resulting for example from clogging of the filter, can easily be detected by means of the measurement of the pressure differential between the upstream side and the downstream side of the filter.

The difference in pressure can be measured with two pressure sensors by subtracting the two results or with one single differential pressure sensor. The use of one single differential pressure sensor in the present invention has the advantage of avoiding timing differences between the measurement of the pressure upstream and the measurement of the pressure downstream of the filter. Furthermore, the use of one single differential pressure sensor makes it possible in an advantageous manner to obtain better measurement accuracy. By way of example, the pressure sensor can be chosen from the group constituted by piezoelectric sensors, piezoresistive sensors and manometers. The expert will know how to choose the sensor that is suitable for the conditions and for the accuracy of the measurement that he wishes to undertake.

Once obtained, the measurement can either be recorded in a storage means situated in the underwater testing device or transmitted to a receiving means situated outside the underwater testing device.

In a first alternative, the measurement of the difference in pressure between the upstream side and the downstream side of the filter is recorded in a storage means situated in the underwater testing device. Said data storage means, which can be electronic, must be suitable to undergo submersion in seawater, at a great depth, for durations which can be relatively long. The measurements stored in said storage means can only be accessible to an operator when the storage means is recovered. Said storage means can be recovered, subsequently to the measurement being taken, by any ways whatsoever known by the expert. For example, the storage means can be recovered when the underwater testing device is bringd to the surface. As an alternative to this, the storage means can be recovered by an underwater robot directly from the still submerged underwater testing device. The advantage of said embodiment is that the underwater testing device is autonomous. There is no need for contact between the underwater testing device and the surface during the measurements of the difference in pressure.

In a second alternative, the measurement of the difference in pressure between the upstream side and the downstream side of the filter is transmitted to a receiving means situated outside the underwater testing device. Transmission of the data can be ensured via a cable or online (for example, wirelessly). The measurements taken in the underwater testing device are advantageously accessible directly and immediately to a user who would have access to the receiving means.

According to a specific embodiment, the measurement of the difference in pressure is transmitted to the receiving means situated outside the underwater testing device via an umbilical which connects the underwater testing device to a floating control unit, typically a boat or a floating platform, for example in line with the submerged underwater testing device. The length of the umbilical according to the invention can be between 500 meters and 4000 meters inclusive. Said length is very obviously a function of the installation site of the underwater testing device, which can advantageously correspond to the installation site of the definitive underwater filtration system. Umbilicals are well-known devices in the area of underwater oil production. They are used, notably, in order to control underwater robots which are intended to intervene in the installations. The umbilicals are water-tight and are capable of resisting outside pressures of between 80 and 300 bars inclusive.

Knowing the difference in pressure between the flow upstream of the filter and the flow downstream of the filter allows the level of clogging to be followed indirectly and therefore the level of clogging of the filter to be known. Said clogging can be due to the normal operation of the filter, and therefore to the nature of the water which is filtered there, but also to the phenomenon of biofouling. Said two elements depend strongly on the biological and physicochemical conditions existing at the site of installation of the underwater testing device, said site corresponding to the projected installation site of the definitive underwater filtration system. The method for testing according to the invention is therefore particularly advantageous for quantifying the risk of clogging over time in a reliable manner, notably as a result of biofouling.

In a preferred manner, the measurement of the difference in pressure can be taken in a repetitive manner, in a preferred manner at a frequency of between once a second and once an hour inclusive, each measurement obtained being recorded in the storage means situated in the underwater testing device or being transmitted to the receiving means situated outside the underwater testing device.

In order to perform the different steps described above, and in particular in order to be able to operate the pump which is suitable for filtering the seawater, the underwater testing device has need of a source of power.

According to a first embodiment, the underwater testing device is supplied with power from the surface via an umbilical. As described above, an umbilical is a well-known device in the area of underwater oil production. The umbilical can conduct an electric current. It can therefore supply the underwater testing device with electricity from the surface. In particular, the umbilical can connect the underwater testing device to a floating control unit, typically a boat or a floating platform, for example in line with the submerged underwater testing device. The same umbilical can ensure several functions at once. Typically, the same umbilical can serve as a pathway for supplying the underwater testing device with power and for transmitting the measurement of the difference in pressure between the upstream side and the downstream side of the filter to a receiving means situated outside the underwater testing device.

According to a second embodiment, the underwater testing device is electrically autonomous and is supplied with power thanks to a battery located within the underwater testing device. The presence of batteries is not preferred on account of their volume and weight. However, the advantage of said embodiment is to make the underwater testing device autonomous and easily movable.

In order to improve the reliability of the measurement of the level of clogging of the filter even more, the inventors have imagined that the method for testing according to the invention can further include the steps consisting in sampling at least one flow chosen from among:
the flow upstream of the filter(s); and
the flow downstream of the filter(s);
and in storing said sample in a storage means situated in the device or in sending said sample to a receiving means situated outside the underwater testing device.

The underwater testing device according to the present invention can therefore further include at least one pipe for sampling one or several flows chosen from among the flow upstream of the filter(s) and the flow downstream of the filter (s). In addition, the underwater testing device can include a means for storing said samples situated in the underwater testing device and/or a means for sending said samples to a receiving means situated outside the underwater testing device.

The device can advantageously further include a sampling pump, placed on one or several sampling pipes, which can be provided with valves. Said sampling step can be ensured remotely via the activation of the sampling pump, and possibly the activation of valves, controlled by an electronic system. An operator located at the control unit can send instructions to actuate the sampling pump and the valves which are transmitted, for example, via the umbilical which connects the underwater testing device and its control unit. As an alternative to this, the pump and the valves can be controlled by a pre-recorded program which does not require the intervention of an operator.

Said sample obtained can therefore either be stored in a storage means situated in the underwater testing device or be sent to a receiving means situated outside the underwater testing device. In the first case, the storage can be effected, for example, in a flask or some kind of container fixed to the underwater testing device. Said sample can be recovered when the underwater testing device is bring to the surface or when the storage means is bring to the surface in some manner or other. In the second case, the sample can be sent to a receiving means outside the underwater testing device, for example via a sampling pipe in an umbilical which connects the underwater testing device to its control unit, where an operator can recover it. A sampling pipe in an umbilical consists of a tube, which is tight vis-à-vis electrical transmission elements which are generally included in the umbilical, which enables liquid samples to be dispatched.

Once recovered, the sampled specimen can be analyzed by an operator.

The sampling step can be one-off, repeated or continuous. Like the measurement of the difference in pressure, the repetition of the sampling step advantageously enables an operator to track the evolution of flows sampled in a same location in the underwater testing device.

It is equally advantageous to sample several specimens in the underwater testing device, in particular at least one specimen upstream of the filter and one specimen downstream of the filter. The analysis and comparison of said specimens can give the operator information on the operation and efficiency of the filter.

When several specimens are sampled, it is preferable that said specimens are not mixed before they are recovered by an operator. To do this, one solution consists in separating the sampling of each specimen in time. When several different types of specimens are transmitted by a sampling pipe in an umbilical, one after another, it is preferable to provide a sufficient volume of specimens such that the specimen is sufficiently pure at a given moment. Said volume of specimens can be evaluated by an expert typically in terms of the flow rate of the flows and the dimensions of the umbilical.

When a flow includes solid elements which are likely to block the sampling pipe situated in the umbilical, it is preferable to store said sample in a storage means situated in the underwater testing device. In particular, this can be a sample of water from the water inlet of the device.

Means intended to reduce, or even eliminate, the clogging of the filters are known by the expert. One of the advantages of the method for testing according to the present invention is that it also enables the effect that said means can have on the clogging of the filter to be evaluated in real operating conditions, that is to say in the biological and physico-chemical conditions existing at the installation site of the underwater testing device, said site advantageously corresponding to the projected installation site of the definitive underwater filtration system.

According to an embodiment, the method for testing according to the invention further includes a recycling step consisting in bringing at least part of the filtrate obtained at the outlet of the filter up to the flow of water which is intended to cross said filter. The underwater testing device according to the invention advantageously includes a recycling circuit which connects the discharge pipe downstream of the filter to the pipe upstream of the filter. Said circuit enables part of the filtrate recovered at the outlet of the filter to be moved to the water flow which is intended to cross said filter. The effect of said recycling system is to dilute the water flow intended to cross the filter, which, on the one hand, increases the incoming liquid flow rate, and, on the other hand, improves the quality of the incoming water flow, thus facilitating its filtration.

In said embodiment, the underwater testing device advantageously further includes a recycling pump. Said pump can be situated in the recycling circuit which connects the discharge pipe downstream of the filter to the pipe upstream of the filter. The pump can be controlled by an electronic system, via for example an umbilical which connects the underwater testing device to its control unit. The pump can be actuated by an operator, in a preferred manner located at the control unit. As an alternative to this, the pump can be controlled by a pre-recorded program which does not require the intervention of an operator.

According to another embodiment, the method for testing according to the invention further includes a step for backwashing the filter. The underwater testing device according to the invention therefore advantageously includes a backwash circuit.

Backwashing is a method known for cleaning filters. It consists in making a flow of water circulate in the opposite direction to the direction of flow of the flow of water across the filter in normal mode. By doing so, the water circulating against the current can take with it elements that are more or less coarse which clog up the filter.

The backwash step can include the stopping of the normal inlet of the water flow into the underwater testing device, the inlet of a water flow into the underwater testing device via a second water inlet, the pipe for said flow up to the face of the filter is initially on the downstream side, the recovery of a flow upstream of said filter and the discharging of said flow into the environment via a second discharge pipe.

As an alternative to this, when the underwater testing device includes several filters in parallel, the backwash step can consist in introducing the entire water flow coming into the underwater testing device toward just one of the filters, in recovering at least part of the filtrate of said filter and in conducting said filtrate up to the downstream face of a second filter situated in parallel with the first via the normal pipe for discharging the filtrate of said second filter, then in recovering said flow upstream of the second filter and discharging said flow into the environment via a discharge pipe of the retentate of the second filter.

The underwater testing device can advantageously further include a backwash pump and possibly one or several valves. The backwash step can be controlled remotely via the actuation of said backwash pump, and possibly the actuation of valves controlled by an electronic system, via for example an umbilical which connects the underwater testing device to its control unit. The pump can be actuated by an operator, in a preferred manner located at the control unit. As an alternative to this, the pump can be controlled by a pre-recorded program which does not require the intervention of an operator.

According to yet another embodiment, the method for testing according to the invention further includes a step consisting in injecting a biocide into the pipe which connects the water inlet and the filter, in a preferred manner close to the water inlet. The underwater testing device can therefore further include one or several biocide tanks, at least one of said tanks being placed in such a manner so as to enable the injection of biocide into the pipe connecting the water inlet and the filter, in a preferred manner close to the water inlet.

The injection of biocide into the water flow flowing into the underwater testing device of the invention allows the phenomenon of biofouling to be reduced. The biocides well known for said application are, for example, DBNPA (di-bromo nitrolo proprionamide) or isothiazoline.

The injection of biocide can be triggered by an electronic system, via for example an umbilical which connects the underwater testing device to its control unit. The valves can be actuated by an operator, in a preferred manner located at the control unit. As an alternative to this, the valves can be controlled by a pre-recorded program which does not require the intervention of an operator.

Furthermore, the method according to the invention can also include a step which consists in injecting biocide into the backwash circuit if there is one present in the underwater testing device.

The method and the device for testing described above are advantageously designed to follow the level of clogging of the filter in the biological and physic-chemical conditions which exist at the installation site of the underwater testing device, said site advantageously corresponding to the projected installation site of the definitive underwater filtration system. The underwater testing device must therefore be submerged so that the method for testing is implemented.

The method for testing according to the invention further includes a preliminary step consisting in submerging the underwater testing device into an aquatic environment at a depth of at least 500 meters, then leaving the device underwater for a duration of between 1 and 12 months inclusive, then bringing the device to the surface.

Said step for installing the underwater testing device can be performed using a floating winch. The winch can be situated, for example, on a boat or on a floating platform. In a preferred manner, the winch is situated close to the control unit. The umbilical can serve as a cable which enables the underwater testing device to be lowered into the water. Once the lowering step has been carried out, according to a preferred embodiment, the underwater testing device is suspended in the water by the umbilical, itself attached to the winch. Said embodiment is advantageous as it enables the underwater testing device to be moved easily and at any time. In this way, tests are able to be carried out at different depths.

However, the invention is not limited to said embodiment and the underwater testing device could equally be placed, for example, on the sea floor.

An object of the present invention is also the underwater testing device which is specifically suitable for the implementation of the method for testing as described above.

Said underwater testing device includes:
at least one filter;
a water inlet which is suitable for introducing a flow of water sampled from the environment of the device into the underwater device;
a pipe connecting said water inlet and said filter;
a discharge pipe downstream of said filter that is suitable for discharging the filtrate into the environment of the device;
at least one pump which is suitable for filtering the flow of water across said filter;
a means for supplying the device with power.

Furthermore, it can have all the advantageous characteristics described above which enable the method for testing to be implemented.

In a preferred manner, the underwater testing device can be in a compact form and can fit in a solid parallelepiped structure, with the exception possibly of the water inlet and the discharge pipe which can extend beyond the structure. The dimensions of said structure can be between 1.2 m (length)×0.5 m (width)×0.4 m (height) and 5 m (length)×2 m (width)×1.6 m (height), for example: 2.5 m (length)×1 m (width)×0.8 m (height) inclusive. The total weight of the unit out of the water can be between 120 kg and 12 000 kg inclusive, for example 1200 kg.

The device for testing according to the invention can be completely or partially marinized. In one particular embodiment, all or part of the device is placed in a pressurized containment isolated from the outside.

Finally, the object of the present invention is the use of said underwater testing device in order to follow the evolution of the clogging of a filter placed in an aquatic environment in real conditions.

The inventors have designed the device and the method according to the present invention for quantifying in a reliable manner the risk of a filter clogging in the biological and physico-chemical conditions existing at the installation site of an underwater testing device, said site corresponding to the projected installation site of the definitive underwater filtration system. The device and the method according to the present invention allow the dimensioning and the operation of the definitive underwater filtration system to be optimized in fine. The measurements and possible sampling carried out advantageously further enable the evolution of the clogging to be followed, the phenomena causing said clogging to be studied and the effect of the means allowing the clogging to be reduced to be tested.

Apart from the objectives of researching and comprehending the physical and chemical phenomena at play, the present devices and method for testing can serve as pilots for a future permanent device which is intended to operate underwater in a sustainable manner. The present device and method for testing can therefore serve for dimensioning the definitive filtration system, for selecting the most efficient cleaning means and for anticipating the future replacement of filters.

Other characteristics and advantages of the present invention will proceed from the description of the specific embodiments shown in the figures.

Figure 1:
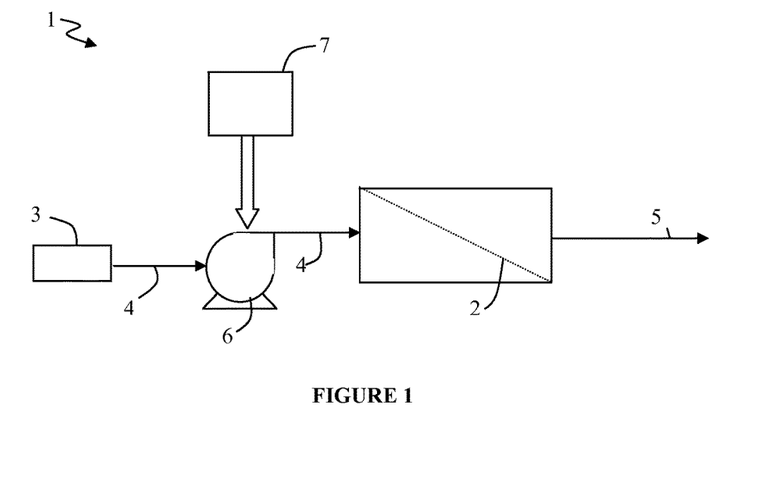
FIG. 1 is a schematic representation of an embodiment of an underwater testing device according to the invention.

FIG. 1 is a schematic representation of an embodiment of an underwater testing device according to the invention.

The underwater testing device 1 includes a filter 2, a water inlet 3 suitable for introducing into the underwater device 1 a flow of water sampled from the environment of the device, a pipe 4 which connects the water inlet 3 to the filter 2, a discharge pipe 5 downstream of the filter 2 which is suitable for discharging the filtrate into the environment of the device. The underwater testing device 1 further includes a pump 6 suitable for filtering seawater across the filter 2. Said pump 6 is situated on the pipe 4 which connects the water inlet 3 to the filter 2. Furthermore, the device includes a means 7 for supplying the device 1 with power, and in particular for supplying the pump 6 with power. Said means 7 can be, in particular, an umbilical which connects the underwater testing device 1 to a power source, or a battery situated in said device 1.

Figure 2:
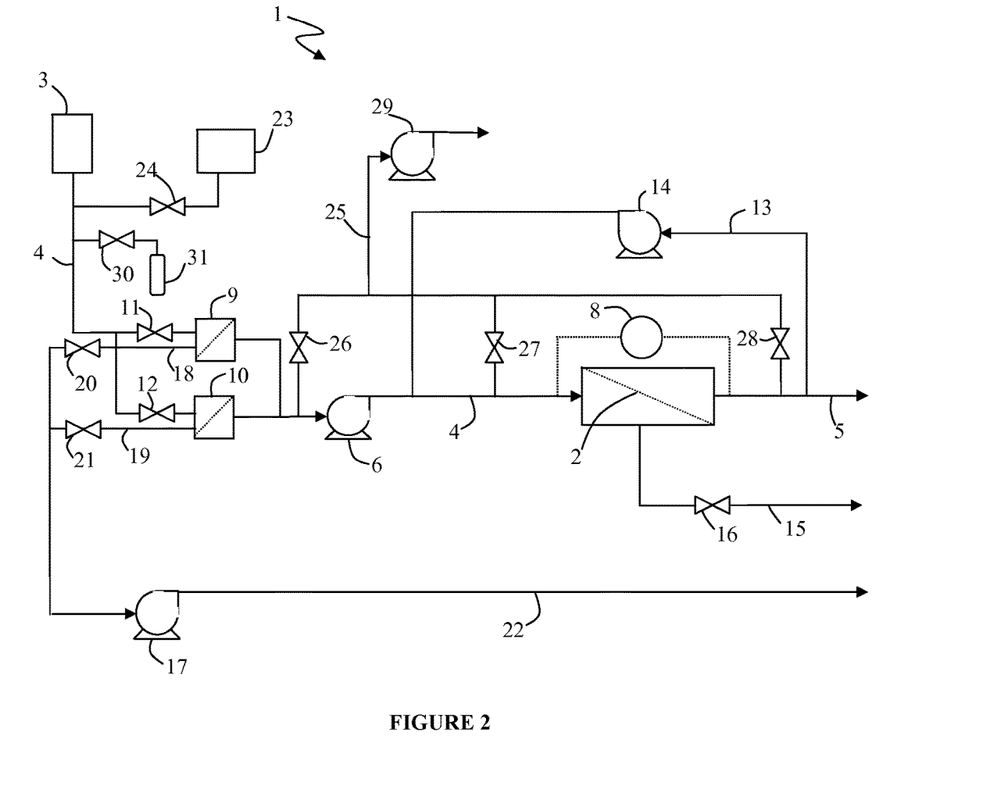
FIG. 2 is a schematic representation of another embodiment of an underwater testing device according to the invention.

FIG. 2 is a schematic representation of another embodiment of an underwater testing device according to the invention.

In said embodiment, the underwater testing device 1 also includes a filter 2, a water inlet 3 suitable for introducing into the underwater device 1 a flow of water sampled from the environment of the device, a pipe 4 which connects the water inlet 3 to the filter 2, a discharge pipe 5 downstream of the filter 2 which is suitable for discharging the filtrate into the environment of the device, and a pump 6 situated on the pipe 4 which connects the water inlet 3 to the filter 2 and is suitable for filtering of seawater across the filter 2.

The means for supplying the device 1 with power is not shown in said schematic representation.

In a preferred manner, the filter 2 is a nanofiltration membrane for desulfation.

The underwater testing device 1 also includes a means for measuring the difference in pressure 8 between the upstream side and the downstream side of said filter 2. The difference in pressure can be measured as shown between the pipe 4 which connects the water inlet to the filter, after the pump 6, and the discharge pipe 5 downstream of the filter 2.

Apart from the filter 2, the underwater testing device 1 includes two pre-filters 9 and 10, arranged in parallel with one another and upstream of the filter 2. The inlet to each of said pre-filters 9 and 10 is controlled by a valve, respectively the valves 11 and 12.

The underwater testing device 1 further includes a recycling circuit 13 which connects the discharge pipe 5 downstream of the filter 2 to the pipe 4 upstream of the filter 2 but downstream of the pump 6. A recycling pump 14 is situated in the recycling circuit 13 so as to enable the flow to circulate in the recycling circuit 13.

The underwater testing device 1 is also provided with a discharge pipe 15 for the retentate of the filter 2. Said pipe 15 opens out into the environment, outside of the underwater testing device 1. The discharge flow rate of the retentate can be controlled thanks to the valve 16.

The underwater testing device 1 further includes a backwash circuit of the pre-filters 9 and 10. The underwater testing device includes a wash pump 17. Furthermore, the pre-filters 9 and 10 each have a discharge pipe for the retentate, 18 and 19 respectively. Said two pipes are provided with valves, 20 and 21 respectively. Such a backwash circuit enables one of the pre-filters to be washed whilst the other one continues to operate normally. It is therefore not necessary to stop the method for testing to be able to clean the pre-filters. For example, if the pre-filter 10 is to be backwashed whilst the pre-filter 9 operates normally: The valves 11 and 21 are open whilst the valves 12 and 20 are closed. The flow of water arriving normally by means of the water inlet 3 through the pipe 4 is directed solely toward the pre-filter 9. The filtrate obtained leaving the pre-filter 9 is divided into two flows: a first flow rejoins the pipe 4 toward the pump 6 and the filter 2, un second flow penetrates into the pre-filter 10 by its face which is normally downstream via the normal discharge pipe of the filtrate of the pre-filter 10. Said second flow crosses the pre-filter in the direction opposite to the normal direction of filtration, and it can carry away with it the matter which could obstruct the pre-filter 10. Said second flow leaves by the pipe 19 which is normally the discharge pipe of the retentate of the pre-filter 10, then is discharged out of the underwater testing device 1 via the pipe 22. The wash pump 17 is situated on the discharge pipe 22, so as to enable the second flow to circulate in the backwash circuit. Now, if the pre-filter 9 needs to be backwashed whilst the pre-filter 10 operates normally, the valves 12 and 20 are opened and the valves 11 and 21 are closed. The backwash method occurs in the same manner by reversing the roles of the pre-filters 9 and 10.

The underwater testing device 1 is also provided with a biocide tank 23. The tank 23 is suitable for injecting biocide a into the pipe 4 connecting the water inlet 3 and the filter 2, close to the water inlet 3. The injection of biocide is controlled by a valve 24.

Furthermore, the underwater testing device 1 includes a sampling pipe 25 for several flows. A first flow is sampled in the pipe 4 between the pre-filters 9/10 and the pump 6, a second flow is sampled in the pipe 4 between the pump 6 and the filter 2, and a third flow is sampled in the discharge pipe 5 downstream of the filter 2. The sampling of each of said flows is controlled by the valves 26, 27 and 28. A sampling pump 29 is situated on the sampling pipe 25 so as to enable specimens of each of the flows to be sampled, and sent toward a receiving means (not shown) situated outside the underwater testing device 1. On the other hand, a sampling of the flow in the pipe 4 downstream of the water inlet 3 is controlled by the valve 30. The flow sampled at this location is stored in the storage means 31, which can be a flask, and which is situated in the underwater testing device 1.

Figure 3:
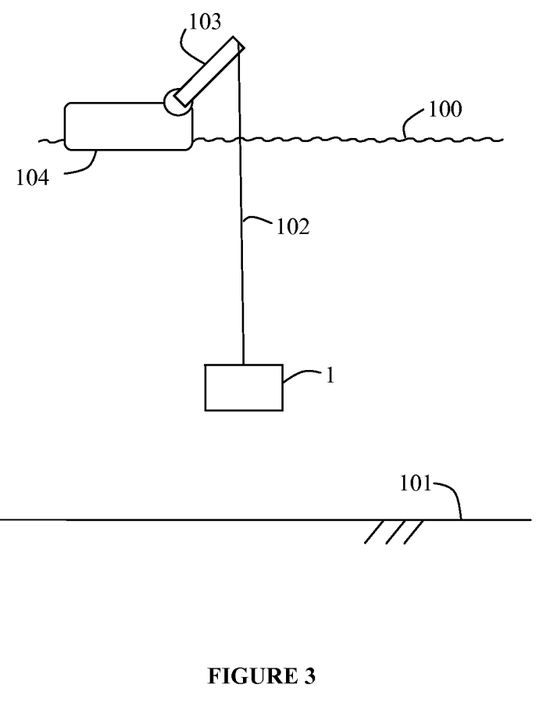
FIG. 3 is a schematic representation of an underwater testing device within the context of its use.

FIG. 3 is a schematic representation of an underwater testing device within the context of its use.

The underwater testing device 1 is shown submerged, between the surface 100 and sea bed 101. The underwater testing device 1 is suspended in the water by an umbilical 102, itself attached to a winch 103 which is situated on a floating platform 104.

In a preferred manner, a control unit (not shown) of the underwater testing device 1 is situated on the floating platform 104.

According to said embodiment, the umbilical 102 can have several functions:

The umbilical 102 can supply the underwater testing device 1 with electric power.

The umbilical 102 can serve as a carrying element to the underwater testing device 1.

The umbilical 102 can be a means for exchanging information between the underwater testing device 1 and the control unit. Typically, the umbilical can transmit the instructions sent by an operator who is located at the control unit for the underwater testing device 1, which is placed underwater. Said instructions can be intended for pumps, valves or for any other element of the underwater testing device 1.

The umbilical 102 can be the transmission pathway for the measurement of the difference in pressure between the upstream side and the downstream side of the filter, when this is measured, between the underwater testing device 1 and a receiving device which can be the control unit.

Finally, the umbilical 102 can be the transmission pathway for the flow specimens sampled in the underwater testing device 1, when the underwater testing device 1 has sampling pipes.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for optimizing a dimensioning and an operation of an underwater filtration system including one or several filters to be placed in an aquatic environment by operating said filter(s) with an underwater testing device in said aquatic environment, said method including the steps:

providing an underwater testing device including said filter(s) and a pump;

placing said underwater testing device underwater at a depth of at least 500 meters in said aquatic environment;

introducing a flow of water taken from said aquatic environment into said underwater testing device via a water inlet;

bringing said flow in the underwater testing device up to said filter(s) with the pump at a flow rate of between 0.02 and 5.00 m$^3$/h inclusive;

obtaining a filtrate downstream of said filter(s) and discharging said filtrate into the aquatic environment via a discharge pipe;

assessing the state of fouling of the said filter(s) of the underwater testing device thereby quantifying the risk of fouling of the underwater filtration system filter(s) in said aquatic environment; and optimizing the dimensioning and the operation of the underwater filtration system according to the risk of fouling of the said underwater filtration system filter(s) quantified in said aquatic environment.

2. The method as claimed in claim 1, wherein said method further includes:
   measuring the difference in pressure between the upstream side and the downstream side of the filter(s); and
   recording said measurement of the difference in pressure in a storage means situated in the underwater testing device or transmitting said measurement of the difference in pressure to a receiving means situated outside the underwater testing device.

3. The method as claimed in claim 2, wherein the measurement of the difference in pressure is taken in a repetitive manner, each measurement obtained being recorded in the storage means situated in the underwater testing device or being transmitted to the receiving means situated outside the underwater testing device.

4. The method as claimed in claim 2, wherein the measurement of the difference in pressure is taken in a repetitive manner, at a frequency of between once a second and once an hour inclusive, each measurement obtained being recorded in the storage means situated in the underwater testing device or being transmitted to the receiving means situated outside the underwater testing device.

5. The method as claimed in claim 1, further includes in sampling at least one flow chosen from among:
   the flow upstream of the filter(s); and
   the flow downstream of the filter(s);
   and in storing said sample in a storage means situated in the underwater testing device or in sending said sample to a receiving means situated outside the underwater testing device.

6. The method as claimed in claim 1, wherein said method further includes a recycling step consisting in bringing at least part of the filtrate obtained at the outlet of the filter up to the flow of water which is intended to cross said filter.

7. The method as claimed in claim 1, wherein said method further includes a step for backwashing the filter.

8. The method as claimed in claim 1, wherein said method further includes a step consisting in injecting a biocide into a pipe which connects the water inlet and the filter.

9. The method as claimed in claim 1, wherein said method further includes a preliminary step consisting in submerging the underwater testing device into an aquatic environment at a depth of at least 500 meters, then leaving the device underwater for a duration of between 1 and 12 months inclusive, then bringing the device to the surface.

10. The method according to claim 1, wherein the underwater testing device is brought to the surface and an operator assesses the state of fouling of the filter(s).

11. The method according to claim 1, wherein the fouling of the filter(s) is assessed by measuring the difference in pressure between the upstream side and the downstream side of the filter(s).

12. The method as claimed in claim 1, wherein said method further includes a step consisting in injecting a biocide into a pipe which connects the water inlet and the filter, close to the water inlet.

* * * * *